(12) United States Patent
Park et al.

(10) Patent No.: US 11,329,286 B2
(45) Date of Patent: May 10, 2022

(54) LITHIUM COBALT-BASED POSITIVE ELECTRODE ACTIVE MATERIAL, PREPARATION METHOD THEREOF, POSITIVE ELECTRODE AND SECONDARY BATTERY INCLUDING THE SAME

(71) Applicant: LG Chem, Ltd., Seoul (KR)

(72) Inventors: Sung Bin Park, Daejeon (KR); Min Kyu You, Daejeon (KR); Chi Ho Jo, Daejeon (KR); Hyuck Hur, Daejeon (KR); Jin Tae Hwang, Daejeon (KR); Wang Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 46 days.

(21) Appl. No.: 16/764,912

(22) PCT Filed: Dec. 10, 2018

(86) PCT No.: PCT/KR2018/015618
§ 371 (c)(1),
(2) Date: May 18, 2020

(87) PCT Pub. No.: WO2019/112399
PCT Pub. Date: Jun. 13, 2019

(65) Prior Publication Data
US 2021/0151752 A1 May 20, 2021

(30) Foreign Application Priority Data
Dec. 8, 2017 (KR) .................. 10-2017-0168694

(51) Int. Cl.
*H01M 4/525* (2010.01)
*C01G 51/00* (2006.01)
(Continued)

(52) U.S. Cl.
CPC .......... *H01M 4/525* (2013.01); *C01G 51/42* (2013.01); *C01G 51/66* (2013.01);
(Continued)

(58) Field of Classification Search
CPC ............ H01M 4/525; H01M 10/0525; H01M 2004/028; H01M 4/485; H01M 10/052;
(Continued)

(56) References Cited

U.S. PATENT DOCUMENTS

2003/0013017 A1 1/2003 Nagayama et al.
2009/0297937 A1 12/2009 Lampe-Onnerud et al.
(Continued)

FOREIGN PATENT DOCUMENTS

| CN | 1763997 A | 4/2006 |
|---|---|---|
| JP | 2002015740 A | 1/2002 |

(Continued)

OTHER PUBLICATIONS

International Search Report for Application No. PCT/KR2018/015618, dated May 30, 2019, pp. 1-2.
(Continued)

*Primary Examiner* — Andrew J. Oyer
(74) *Attorney, Agent, or Firm* — Lerner, David, Littenberg, Krumholz & Mentlik, LLP

(57) ABSTRACT

A lithium cobalt-based positive electrode active material is provide, which includes sodium and calcium, wherein the total amount of the sodium and calcium is 150 ppm to 500 ppm based on the total weight of the lithium cobalt-based positive electrode active material. A method for preparing the lithium cobalt-based positive electrode active material is also provided.

11 Claims, 1 Drawing Sheet

(51) Int. Cl.
*H01M 10/0525* (2010.01)
*H01M 4/02* (2006.01)

(52) U.S. Cl.
CPC ..... *H01M 10/0525* (2013.01); *C01P 2002/52* (2013.01); *C01P 2006/40* (2013.01); *H01M 2004/028* (2013.01)

(58) Field of Classification Search
CPC ..... C01G 51/42; C01G 51/66; C01P 2002/52; C01P 2006/40; Y02E 60/10
See application file for complete search history.

(56) References Cited

U.S. PATENT DOCUMENTS

| | | | |
|---|---|---|---|
| 2013/0101900 | A1 | 4/2013 | Nagai |
| 2015/0111101 | A1* | 4/2015 | Ikenuma .............. H01M 4/622 429/217 |
| 2016/0141606 | A1* | 5/2016 | Ahn .................... C01G 51/006 252/182.1 |
| 2017/0077508 | A1 | 3/2017 | Hoshina et al. |

FOREIGN PATENT DOCUMENTS

| | | |
|---|---|---|
| JP | 4431785 B2 | 3/2010 |
| JP | 2015109264 A | 6/2015 |
| JP | 2017059390 A | 3/2017 |
| JP | 2017139077 A | 8/2017 |
| KR | 100453595 B1 | 10/2004 |
| KR | 20050087303 A | 8/2005 |
| KR | 20110008264 A | 1/2011 |
| KR | 20120025445 A | 3/2012 |
| KR | 20160059781 A | 5/2016 |

OTHER PUBLICATIONS

Extended European Search Report including Written Opinion for Application No. EP18885471.5, dated Nov. 26, 2020, pp. 1-7.
He et al., Synthetic optimization of spherical LiCoO2 and precursor via uniform-phase precipitation, Journal of Power Sources, available online Feb. 2006, pp. 529-534, vol. 158, XP027938979.
Matsui et al., Improved cycling performance of P2-type layered sodium cobalt oxide by calcium substitution, Journal of Power Sources, available online Jan. 2015, pp. 205-209, XP055751868.
Sathiyamoorthi et al., New solid-state synthesis routine and electrochemical properties of calcium based ceramic oxidebattery materials for lithium battery applications, Materials Letters, available online Dec. 2006, pp. 3746-3750, vol. 61, XP022101008.

* cited by examiner

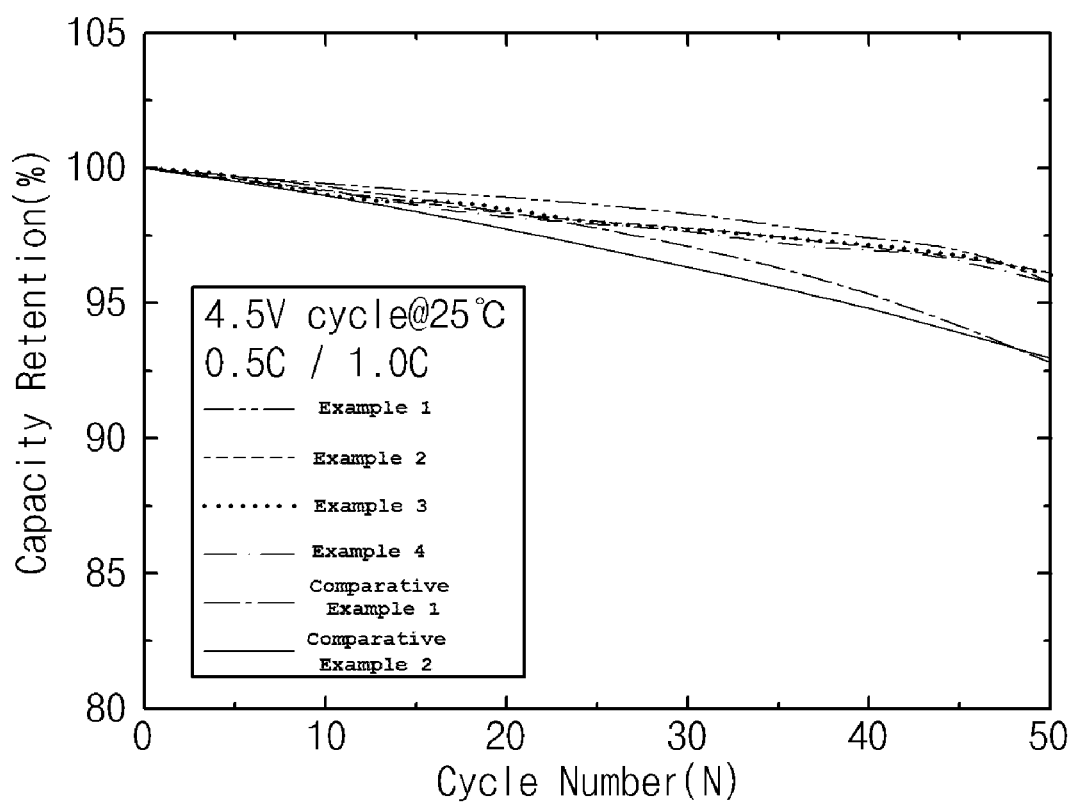

LITHIUM COBALT-BASED POSITIVE ELECTRODE ACTIVE MATERIAL, PREPARATION METHOD THEREOF, POSITIVE ELECTRODE AND SECONDARY BATTERY INCLUDING THE SAME

CROSS-REFERENCE TO RELATED APPLICATIONS

The present application is a national stage entry under 35 USC § 371 of PCT/KR2018/015618 filed on Dec. 10, 2018, which claims priority to Korean Patent Application No. 10-2017-0168694, filed on Dec. 8, 2017, in the Korean Intellectual Property Office, the disclosures of which are incorporated herein in their entirety by reference.

TECHNICAL FIELD

The present invention relates to a lithium cobalt-based positive electrode active material, a preparation method thereof, a positive electrode and a lithium secondary battery including the same, and more specifically, to a lithium cobalt-based positive electrode active material having excellent cycle properties even during a high-voltage driving of 4.45 V or higher, a preparation method thereof, a positive electrode and a lithium secondary battery including the same.

BACKGROUND ART

As technology development and demand for mobile devices have increased, the demand for secondary batteries as an energy source has been rapidly increased. Among such secondary batteries, lithium secondary batteries having high energy density and voltage, long cycle life, and low self-discharging rate have been commercialized and widely used.

One example of positive electrode active materials for a lithium secondary battery which has been actively developed and used is $LiCoO_2$ of a layered structure. $LiCoO_2$ is most widely used since the synthesis thereof is easily achieved and the electrochemical performance thereof, including lifespan properties, is excellent. However, due to the poor structural stability thereof, there is a limitation in applying $LiCoO_2$ to a high capacity battery technology.

Therefore, a technology of improving the structural stability of a lithium cobalt oxide by coating a metal oxide such as Al, Zr, and the like on the surface of a lithium cobalt oxide particle has been proposed. A lithium cobalt oxide coated with a metal oxide as described above exhibited excellent electrochemical performance in a battery having a driving voltage of less than 4.45 V. However, according to the studies of the present inventors, when a lithium cobalt oxide coated with a metal oxide is applied to a battery having a driving voltage of more than 4.45 V, the cycle properties are rapidly deteriorated.

Therefore, there has been a demand for developing a lithium cobalt-based positive electrode active material which is excellent in cycle properties even when applied to high voltage.

DISCLOSURE OF THE INVENTION

Technical Problem

An aspect of the present invention provides a lithium cobalt-based positive electrode active material capable of effectively suppressing cobalt elution even during a driving at a high voltage of 4.45 V or higher.

Technical Solution

According to an aspect of the present invention, there is provided a lithium cobalt-based positive electrode active material including sodium and calcium, wherein the total amount of the sodium and calcium is 150 ppm to 500 ppm based on the total weight of the lithium cobalt-based positive electrode active material.

At this time, the sodium and calcium may be included in lithium sites.

Specifically, the lithium cobalt-based positive electrode active material may be represented by Formula 1 below.

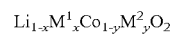 [Formula 1]

In Formula 1, $M^1$ includes Na and Ca, $M^2$ is one or more selected from the group consisting of Al, Mg, W, Mo, Zr, Ti, Fe, V, Cr, Ba, Ca, and Nb, and $0<x\leq0.1$ and $0\leq y\leq0.2$.

According to another aspect of the present invention, there is provided a method for preparing a lithium cobalt-based positive electrode active material, the method including mixing a cobalt precursor containing sodium and calcium and having a total amount of the sodium and calcium of 600 ppm or less with a lithium raw material to prepare a mixture, and firing the mixture to prepare a lithium cobalt-based positive electrode active material in which the total amount of sodium and calcium is 150 ppm to 500 ppm based on the total weight of the lithium cobalt-based positive electrode active material.

The method for preparing a lithium cobalt-based positive electrode active material may further include, if necessary, a step of measuring the contents of sodium and calcium in a cobalt precursor before the forming of a mixture.

In addition, the preparing of the mixture may further include mixing at least one among a sodium raw material and a calcium raw material additionally. At this time, it is preferable that the sodium raw material and the calcium raw material are mixed such that the content of sodium and calcium in a lithium cobalt-based positive electrode active material is 150 ppm to 500 ppm.

According to yet another aspect of the present invention, there is provided a positive electrode including the positive electrode active material according to the present invention and a lithium secondary battery including the positive electrode.

Advantageous Effects

A lithium cobalt-based positive electrode active material of the present invention which includes sodium and calcium in particular amounts exhibits excellent cycle properties when applied to a battery driven at a high voltage of 4.45 V or higher.

BRIEF DESCRIPTION OF THE DRAWING

The FIGURE is a graph showing a capacity retention rate according to the number of cycles in accordance with Experimental Example 1.

BEST MODE FOR CARRYING OUT THE INVENTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

In the present invention, the content of each component in a lithium cobalt-based positive electrode active material or in a cobalt precursor may be measured by Inductively Coupled Plasma-Atomic Emission Spectrometer (ICP-AES). Specifically, the content of each of the components may be measured by ICAP 6300 of Thermo Fisher Co.

The present inventors have repeatedly conducted intensive research on developing a lithium cobalt-based positive electrode active material capable of exhibiting excellent cycle properties even driven at a high voltage of 4.45 V or higher. As a result, the present inventors have found that the above-described objective may be achieved by adjusting the content of sodium and calcium to a specific range, and have completed the present invention.

Lithium Cobalt-based Positive Electrode Active Material

First, a lithium cobalt-based positive electrode active material according to the present invention will be described.

The lithium cobalt-based positive electrode active material according to the present invention is a lithium cobalt-based positive electrode active material containing sodium and calcium. At this time, the total amount of the sodium and calcium is 150 ppm to 500 ppm, preferably 200 ppm to 400 ppm, more preferably 200 ppm to 300 ppm based on the total weight of the lithium cobalt-based positive electrode active material.

A lithium cobalt-based positive electrode active material is usually prepared by mixing a lithium raw material such as lithium carbonate and a cobalt precursor such as cobalt oxide and firing the mixture. In the preparation of the cobalt precursor, substances such as sodium and calcium are contained in the cobalt precursor as impurities, remaining in the positive electrode active material. Since such impurities adversely affect the properties of the positive electrode active material, it was common to minimize the amount of the impurities. However, according to the studies of the present inventors, when the content of sodium and calcium contained in the positive electrode active material were controlled to be within the range of the present invention, that is, 150 ppm to 500 ppm, there was an effect in that cycle properties were improved when driven at a high voltage of 4.45 V or higher. Meanwhile, when the content of sodium and calcium was out of the above range, there was no effect of improvement in the cycle properties.

Meanwhile, the sodium and calcium may be included in lithium sites of a lithium cobalt-based positive electrode active material, and when a part of the lithium sites is replaced with sodium and calcium as described above, the structural stability of the lithium cobalt-based positive electrode active material is improved, so that cycle properties at a high voltage are improved.

Specifically, the lithium cobalt-based positive electrode active material may be represented by Formula 1 below.

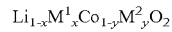  [Formula 1]

In Formula 1, the $M^1$ is an element substituted for a lithium site and includes Na and Ca.

Meanwhile, the $M^2$ is an element substituted for a cobalt site and may be one or more selected from the group consisting of Al, Mg, W, Mo, Zr, Ti, Fe, V, Cr, Ba, Ca, and Nb. Preferably, the $M^2$ may be Mg, Ti, or a combination thereof.

The x represents the molar ratio of the $M^1$ element in a lithium cobalt oxide particle, and may satisfy the relation of $0<x\leq0.1$, preferably $0<x\leq0.05$.

The y represents the molar ratio of the $M^2$ element, and may satisfy the relation of $0\leq y\leq 0.2$, preferably $0\leq y\leq 0.1$.

Meanwhile, the lithium cobalt-based positive electrode active material may further include, if necessary, a coating layer on the surface of the lithium cobalt oxide represented by Formula 1 above. At this time, the coating layer may include one or more elements (hereinafter, a 'coating element') selected from the group consisting of Al, Ti, W, B, F, P, Mg, Ni, Co, Fe, Cr, V, Cu, Ca, Zn, Zr, Nb. Mo, Sr, Sb, Bi, Si, and S.

Meanwhile, the positive electrode active material according to the present invention may include lithium in a constant concentration regardless of the position inside the particle, or may have a concentration gradient gradually increasing from the surface of the active material particle to the center. When the lithium is distributed in the positive electrode active material to have a concentration gradient, the concentration gradient may be in the form of a primary function or a secondary function which varies depending on the thickness of the particle in a direction from the center of the active material particle to the surface.

The concentration or content of each component in the positive electrode active material may be measured by various component analysis methods known in the art, for example X-ray photoelectron Spectroscopy (XPS), Transmission Electron Microscopy (TEM), Energy Disperive x-ray spectroscopy (EDS), Inductively Coupled Plasma-Atomic Emission Spectrometer (ICP-AES), Time of Flight Secondary Ion Mass Spectrometry (ToF-SIMS), and the like.

The positive electrode active material according to the present invention may have an average particle diameter ($D_{50}$) of 3 μm to 50 μm, preferably 10 μm to 50 μm. When the average particle diameter ($D_{50}$) of the positive electrode active material satisfies the above range, an appropriate specific surface area and an appropriate positive electrode mixture density may be implemented. At this time, the average particle diameter ($D_{50}$) of the positive electrode active material refers to a particle diameter at 50% in a particle diameter distribution, and may be, for example, measured by a laser diffraction method. Specifically, the positive electrode active material particles are dispersed in a dispersion medium, and then introduced to a commercially available laser diffraction particle size measurement device (for example, Microtrac MT 3000) to be irradiated with an ultrasonic wave of about 28 kHz to an output of 60 W. Thereafter, the particle diameter may be measured at 50% in volume cumulative particle diameter distribution.

Method for Preparing Lithium Cobalt-based Positive Electrode Active Material

Next, a method for preparing a lithium cobalt-based positive electrode active material according to the present invention will be described.

The method for preparing a lithium cobalt-based positive electrode active material according to the present invention includes (1) mixing a cobalt precursor containing sodium and calcium with a lithium raw material to prepare a mixture, and (2) firing the mixture to prepare a lithium cobalt-based positive electrode active material.

First, a cobalt precursor containing sodium and calcium is prepared. At this time, it is preferable that the cobalt precursor contains sodium and calcium in an amount of 600 ppm or less, preferably 50 ppm to 600 ppm, more preferably 50 ppm to 400 ppm based on the total weight of the cobalt precursor. When the content of sodium and calcium in the cobalt precursor satisfies the above range, a positive electrode active material having excellent cycle properties under a high voltage may be obtained.

In order to prepare a cobalt precursor containing sodium and calcium in the above range, if necessary, a step of measuring the contents of sodium and calcium in a cobalt precursor may be performed before forming a mixture. At this time, the content of sodium and calcium in the cobalt precursor may be measured by various component analysis methods known in the art, and may be measured by, for example, Inductively Coupled Plasma-Atomic Emission Spectrometer (ICP-AES). By selectively using a cobalt precursor containing sodium and calcium in an amount of 600 ppm or less through the measurement, it is possible to control the content of sodium and calcium in a lithium cobalt-based positive electrode active material finally prepared.

Meanwhile, the cobalt precursor may be, for example, an oxide, a hydroxide, an oxyhydroxide, a halide, a nitrate, a carbonate, an acetate, an oxalate, a citrate, or a sulfate, and the like, all containing cobalt, more specifically $Co(OH)_2$, $Co_2O_4$, $CoOOH$, $Co(OCOCH_3)_2 \cdot 4H_2O$ $Co(NO_3)_2 \cdot 6H_2O$, or $Co(SO_4)_2 \cdot 7H_2O$, and the like, and any one thereof or a mixture of two or more thereof may be used.

When the cobalt precursor is prepared as described above, the cobalt precursor is mixed with a lithium raw material to prepare a mixture. At this time, the cobalt precursor and the lithium raw material are mixed in an amount satisfying a stoichiometric ratio.

The lithium raw material may be, for example, an oxide, a hydroxide, an oxyhydroxide, a halide, a nitrate, a carbonate, an acetate, an oxalate, a citrate, or a sulfate, and the like, all containing lithium, more specifically $Li_2CO_3$, $LiNO_3$, $LiNO_2$, $LiOH$, $LiOH \cdot H_2O$, $LiH$, $LiF$, $LiCl$, $LiBr$, $LiI$, $Li_2O$, $Li_2SO_4$, $CH_3COOLi$, or $Li_3C_6H_6O_7$, and the like, and any one thereof or a mixture of two or more thereof may be used.

Meanwhile, the preparing of the mixture may further include, if necessary, mixing at least one among a sodium raw material and a calcium raw material additionally. That is, in the mixture, a sodium raw material and/or a calcium raw material may be further included. The above step is to control the content of sodium and calcium in a positive electrode active material finally prepared to be 150 to 500 ppm by additionally introducing sodium and/or calcium in case the amount of sodium and calcium contained in the cobalt precursor is not sufficient. At this time, the sodium raw material and the calcium raw material are mixed such that the total amount of sodium and calcium in a lithium cobalt-based positive electrode active material is 150 ppm to 500 ppm based on the total weight of the lithium cobalt-based positive electrode active material.

At this time, as the sodium raw material, a carbonate, a halogenated salt, a hydroxide and the like, all containing sodium, may be used. Specifically, $Na_2CO_3$, $NaCl$, $NaOH$ and the like may be used. At this time, as the calcium raw material, a carbonate, a halogenated salt, a hydroxide and the like, all containing calcium, may be used. Specifically, $CaCO_3$, $CaCl_2$, $Ca(OH)_2$, and the like may be used.

Alternatively, if necessary, the mixture may further include a doping raw material containing the $M^2$ element. The doping element raw material may be one or more metals selected from the group consisting of Al, Mg, W, Mo, Zr, Ti, Fe, V, Cr, Ba, Ca, and Nb, or an oxide, a hydroxide, an oxyhydroxide, a halide, a nitrate, a carbonate an acetate, an oxalate, a citrate, or a sulfate, and the like, all containing the same. Any one thereof or a mixture of two or more thereof may be used.

When the mixture is prepared as described above, the mixture is fired to prepare a lithium cobalt-based positive electrode active material in which the total amount of sodium and calcium is 150 ppm to 500 ppm based on the total weight of the lithium cobalt-based positive electrode active material. At this time, the firing may be performed in a temperature range of 800° C. to 1200° C., preferably 900° C. to 1100° C., and may be performed in the atmosphere or in an oxygen atmosphere. It is preferable that the firing is performed for 6 hours to 18 hours, preferably 8 hours to 12 hours.

Meanwhile, if necessary, a step for forming a coating layer on the lithium cobalt-based positive electrode active material prepared as described above may be further performed.

The coating layer may be formed by using a method for forming a coating layer well known in the art, for example, a wet coating method, a dry coating method, a plasma coating method, Atomic Layer Deposition (ALD) or the like.

The wet coating method may be performed, for example, by adding a suitable solvent such as ethanol, water, methanol, acetone, and the like to a lithium cobalt oxide and a coating raw material, and mixing the mixture until the solvent disappears.

The drying coating method may be performed, for example, by mixing a lithium cobalt oxide and a coating raw material in a solid phase without a solvent. For example, a grinder mixing method or a mechano fusion method may be used.

Meanwhile, the coating raw material may be an oxide, a hydroxide, an oxyhydroxide, a carbonate, a sulfate, a halide, a sulfide, an acetate, or a carboxylate, or a combination thereof each including one or more elements (hereinafter, referred to as a 'coating element') selected from the group consisting of Al, Ti, W, B, F, P, Mg, Ni, Co, Fe, Cr, V, Cu, Ca, Zn, Zr, Nb. Mo, Sr, Sb, Bi, Si, and S, for example, $ZnO$, $Al_2O_3$, $Al(OH)_3$, $AlSO_4$, $AlCl_3$, Al-isopropoxide, $AlNO_3$, $TiO_2$, $WO_3$, $AlF$, $H_2BO_3$, $HBO_2$, $H_3BO_3$, $H_2B_4O_7$, $B_2O_3$, $C_6H_5B(OH)_2$, $(C_6H_5O)_3B$, $[(CH_3(CH_2)_3O)_3B$, $C_3H_9B_3O_6$, $(C_3H_7O_3)B$, $Li_3WO_4$, $(NH_4)_{10}W_{12}O_{41} \cdot 5H_2O$, $NH_4H_2PO_4$, and the like, but is not limited thereto.

After the coating raw material is attached to the surface of the lithium cobalt oxide through the above method, a coating layer may be formed through a heat treatment.

Positive Electrode and Lithium Secondary Battery

Next, a positive electrode according to the present invention will be described.

The positive electrode active material for a secondary battery according to the present invention may be usefully used for manufacturing a positive electrode for a secondary battery.

Specifically, a positive electrode for a secondary battery according to the present invention includes a positive electrode current collector, and a positive electrode active material layer formed on the positive electrode current collector. At this time, the positive electrode active material layer includes the positive electrode active material according to the present invention.

The positive electrode may be manufactured according to a typical manufacturing method of a positive electrode except that the positive electrode active material according to the present invention is used. For example, the positive electrode may be manufactured by manufacturing a positive electrode mixture by dissolving or dispersing components constituting a positive electrode active material layer, which are a positive electrode active material, a conductive material and/or a binder, in a solvent, applying the mixture on at least one surface of a positive electrode current collector, followed by drying and then roll-pressing. Alternatively, the positive electrode may be manufactured by casting the positive electrode mixture on a separate support, and then laminating a film peeled off from the support on the positive electrode current collector.

At this time, the positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, and a non-woven body.

On at least one surface of the current collector, a positive electrode active material layer is disposed, which includes the positive electrode active material according to the present invention, and when necessary, further optionally includes at least one among a conductive material and a binder optionally.

The positive electrode active material includes the above positive electrode active material according to the present invention, that is, a lithium cobalt-based positive electrode active material containing sodium and calcium in an amount of 150 ppm to 500 ppm based on the total weight of the lithium cobalt-based positive electrode active material. Detailed contents of the positive electrode active material according to the present invention are the same as those described above, and thus, a detailed description thereof will be omitted.

At this time, the positive electrode active material may be included in an amount of 80-99 wt %, more specifically 85-98 wt % based on the total weight of the positive electrode active material layer. When included in the above content range, excellent capacity properties may be exhibited.

The conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 1 wt % to 30 wt % based on the total weight of the positive electrode active material layer.

Also, the binder serves to improve the bonding between positive electrode active material particles and the adhesion between the positive electrode active material and the current collector. Specific examples of the binder may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % based on the total weight of the positive electrode active material layer.

Meanwhile, the solvent used in preparing the positive electrode mixture may be a solvent commonly used in the art. For example, dimethyl sulfoxide (DMSO), isopropyl alcohol, N-methylpyrrolidone (NMP), acetone, water, and the like may be used alone, or a mixture thereof may be used. The amount of the solvent to be used may be appropriately adjusted in consideration of the applying thickness, preparation yield, viscosity, and the like of a slurry.

Next, a secondary battery according to the present invention will be described.

The secondary battery according to the present invention includes a positive electrode, a negative electrode disposed to face the positive electrode, a separator interposed between the positive electrode and the negative electrode, and an electrolyte. At this time, the positive electrode is the positive electrode according to the present invention described above.

Meanwhile, the secondary battery may further include a battery case for accommodating an electrode assembly composed of the positive electrode, the negative electrode, and the separator, and a sealing member for sealing the battery case, optionally.

In the secondary battery, the negative electrode includes a negative electrode current collector and a negative electrode active material layer disposed on at least one surface of the negative electrode current collector.

The negative electrode may be manufactured according to a typical manufacturing method of a negative electrode known in the art. For example, the negative electrode may be manufactured by manufacturing a negative electrode mixture by dissolving or dispersing components constituting a negative electrode active material layer, which are a negative electrode active material, a conductive material and/or a binder, in a solvent, applying the mixture on at least one surface of a negative electrode current collector, followed by drying and then roll-pressing.

The negative electrode current collector is not particularly limited as long as it has high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode collector may typically have a thickness of 3 μm to 500 μm, and as in the case of the positive electrode current collector, microscopic irregularities may be formed on a surface of the negative electrode current collector to improve the adhesion of a negative electrode active material. For example, the negative electrode current collector may be used in various forms such as a film, a sheet, a foil, a net, a porous body, a foam, a non-woven body, and the like.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_v(0<v<2)$, $SnO_2$, a vanadium oxide, and a lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may include soft carbon and hard carbon, and typical examples of the high crystalline carbon may include irregular, planar, flaky, spherical, or fibrous natural graphite or artificial graphite, Kish graphite, pyrolytic carbon, mesophase pitch-based carbon fiber, a meso-carbon microbead, a mesophase pitch, and high-temperature sintered carbon such as petroleum or a coal tar pitch derived coke.

Also, the binder and the conductive material may be the same as those described above in the description of the positive electrode.

Meanwhile, in the secondary battery, the separator is to separate the negative electrode and the positive electrode and to provide a movement path for lithium ions. Any separator may be used without particular limitation as long as it is typically used as a separator in a secondary battery. Particularly, a separator having high moisture-retention ability for an electrolyte as well as low resistance to the movement of electrolyte ions is preferable. Specifically, as the separator, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Furthermore, a coated separator including a ceramic component or a polymer material may be used to secure heat resistance or mechanical strength, and may be used in a single-layered or a multi-layered structure, selectively.

Meanwhile, the electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the manufacturing of a secondary battery, but is not limited thereto.

Specifically, the electrolyte may include an organic solvent and a lithium salt.

Any organic solvent may be used as the organic solvent without particular limitation as long as it may serve as a medium through which ions involved in an electrochemical reaction of the battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having high ionic conductivity and high dielectric constant, which may increase charging/discharging performance of the battery, and a low-viscosity linear carbonate-based compound (e.g., ethylmethyl carbonate, dimethyl carbonate, or diethyl carbonate) is more preferable. In this case, when the cyclic carbonate and the chain carbonate are mixed in a volume ratio of about 1:1 to about 1:9, the performance of the electrolyte may be excellent.

Any compound may be used as the lithium salt without particular limitation as long as it may provide lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_2)_2$, $LiN(C_2F_5SO_2)_2$, $LiN(CF_3SO_2)_2$. LiCl, LiI, or $LiB(C_2O_4)_2$ may be used as the lithium salt. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the reduction in battery capacity, and improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may further be included in addition to the above electrolyte components. At this time, the additive may be included in an amount of 0.1 wt % to 5 wt % based on the total weight of the electrolyte.

As described above, a secondary battery including the positive electrode active material according to the present invention has excellent electrical properties and high-temperature storage properties, and thus, may be usefully applied to portable devices such as a mobile phone, a notebook computer, and a digital camera, and to electric cars such as a hybrid electric vehicle (HEV). Particularly, the secondary battery according to the present invention may be used as a high-voltage battery of 4.45 V or higher.

In addition, the secondary battery according to the present invention may be used as a unit cell of a battery module, and the battery module may be applied to a battery pack. The battery module or the battery pack may be used as a power source of at least one medium-and-large sized device such as a power tool; electric cars including an electric vehicle (EV), a hybrid electric vehicle (HEV), and a plug-in hybrid electric vehicle (PHEV); or a power storage system

MODE FOR CARRYING OUT THE INVENTION

Hereinafter, examples of the present invention will be described in detail so that those skilled in the art can easily carry out the present invention. The present invention may, however, be embodied in many different forms and is not limited to the examples set forth herein.

Example 1

80.27 g of a cobalt precursor $Co_3O_4$ containing sodium and calcium in an amount of 305 ppm based on the total weight of the cobalt precursor and 18.47 g of $Li_2CO_3$ (lithium raw material) were mixed, and then the mixture was fired for 10 hours at 1050° C. to prepare a lithium cobalt positive electrode active material. The total amount of sodium and calcium in the prepared lithium cobalt-based positive electrode active material was 250 ppm based on the total weight of the lithium cobalt-based positive electrode active material.

Example 2

To 80.27 g of a cobalt precursor $Co_3O_4$ containing sodium and calcium in an amount of 120 ppm based on the total weight of the cobalt precursor and 18.47 g of $Li_2CO_3$ (lithium raw material), 23 mg of sodium carbonate and 12.5 mg of calcium carbonate were additionally mixed, and then the mixture was fired for 10 hours at 1050° C. to prepare a lithium cobalt positive electrode active material. The content of sodium and calcium additionally introduced was respectively about 120 ppm and 60 ppm based on the total weight of the cobalt precursor, and was respectively about 100 ppm and 50 ppm based on the total weight of the lithium cobalt-based positive electrode active material. The total amount of sodium and calcium in the prepared lithium cobalt-based positive electrode active material was 250 ppm based on the total weight of the lithium cobalt-based positive electrode active material.

Example 3

80.27 g of a cobalt precursor $Co_3O_4$ containing sodium and calcium in an amount of 183 ppm based on the total weight of the cobalt precursor and 18.47 g of $Li_2CO_3$ (lithium raw material) were mixed, and then the mixture was fired for 10 hours at 1050° C. to prepare a lithium cobalt positive electrode active material. The total amount of sodium and calcium in the prepared lithium cobalt-based positive electrode active material was 150 ppm based on the total weight of the lithium cobalt-based positive electrode active material.

Example 4

To 80.27 g of a cobalt precursor $Co_3O_4$ containing sodium and calcium in an amount of 365 ppm based on the total weight of the cobalt precursor and 18.47 g of $Li_2CO_3$ (lithium raw material), 0.5 mg of sodium carbonate and 1 mg of calcium carbonate were additionally mixed, and then the mixture was fired for 10 hours at 1050° C. to prepare a lithium cobalt positive electrode active material. At this time, the content of sodium and calcium additionally introduced was respectively about 122 ppm and 122 ppm based on the total weight of the cobalt precursor, and was respectively about 100 ppm and 100 ppm based on the total weight of the lithium cobalt-based positive electrode active material. The total amount of sodium and calcium in the prepared lithium cobalt-based positive electrode active material was 500 ppm based on the total weight of the lithium cobalt-based positive electrode active material.

Comparative Example 1

A lithium cobalt positive electrode active material was prepared in the same manner as in Example 1 except that a cobalt precursor $Co_3O_4$ containing sodium and calcium in an amount of 120 ppm based on the total weight of the cobalt precursor was used. The total amount of sodium and calcium in the prepared lithium cobalt-based positive electrode active material was 100 ppm based on the total weight of the lithium cobalt-based positive electrode active material.

Comparative Example 2

A lithium cobalt positive electrode active material was prepared in the same manner as in Example 1 except that a cobalt precursor $Co_3O_4$ containing sodium and calcium in an amount of 720 ppm based on the total weight of the cobalt precursor was used. The total amount of sodium and calcium in the prepared lithium cobalt-based positive electrode active material was 600 ppm based on the total weight of the lithium cobalt-based positive electrode active material.

Experimental Example 1

The positive electrode active material respectively prepared in Examples 1-4 and Comparative Examples 1 and 2 were used to manufacture lithium secondary batteries.

Specifically, the positive electrode active materials respectively prepared in Examples 1-4 and Comparative Examples 1 and 2, carbon black as a conductive material, and PVdF as a binder were mixed in N-methylpyrrolidone, which is a solvent, at a weight ratio of 96:2:2 to prepare positive electrode mixtures (viscosity: 5000 mPa·s), and the mixtures were applied on an aluminum current collectors, dried, and roll-pressed to manufacture positive electrodes.

Also, a lithium metal electrode was used as a negative electrode.

A porous polyethylene separator was interposed between each of the positive electrodes and the negative electrode which were prepared as described above to prepare electrode assemblies, and then the electrode assemblies each were placed inside a battery case. Thereafter, an electrolyte was injected into each of the cases to manufacture coin cells. At this time, the electrolyte was prepared by dissolving lithium hexafluorophosphate having a concentration of 1.0 M in an organic solvent in which ethylene carbonate/dimethyl carbonate/ethylmethyl carbonate were mixed in a volume ratio of 3:4:3.

The lithium secondary battery manufactured as described above was charged at 25° C. to 4.5 V, and then charged/discharged under conditions of 0.5 C/1.0 C to measure a capacity retention rate [%] for 50 cycles. The measurement results are shown in the FIGURE.

As shown in the FIGURE, in the case of the batteries respectively manufactured using the positive electrode active materials of each of Examples 1-4 exhibited a capacity retention rate of 95% or higher even after 50 cycles. However, in the case of the batteries respectively manufactured using the positive electrode active materials of each of Comparative Examples 1 and 2, the capacity retention rate thereof was significantly dropped after 30 cycles.

The invention claimed is:
1. A lithium cobalt-based positive electrode active material comprising sodium and calcium,
  wherein a total amount of the sodium and calcium is 150 ppm to 500 ppm based on a total weight of the lithium cobalt-based positive electrode active material, and wherein the lithium cobalt-based positive electrode active material is represented by Formula 1 below:

$$Li_{1-x}M^1_xCo_{1-y}M^2_yO_2 \qquad \text{[Formula 1]}$$

wherein $M^1$ includes Na and Ca, the $M^2$ is one or more selected from the group consisting of Al, Mg, W, Mo, Zr, Ti, Fe, V, Cr, Ba, Ca, and Nb, and $0<x\le0.1$ and $0\le y\le0.2$.

2. The lithium cobalt-based positive electrode active material of claim 1, wherein the sodium and calcium are included in lithium sites of the lithium cobalt-based positive electrode active material.

3. The lithium cobalt-based positive electrode active material of claim 1, wherein the $M^1$ is substitute for a lithium site and the $M^2$ is substituted for a cobalt site.

4. A positive electrode comprising the positive electrode active material of claim 1.

5. A lithium secondary battery comprising the positive electrode of claim 4.

6. The lithium secondary battery of claim 5, wherein a driving voltage of the lithium secondary battery is 4.45 V or higher.

7. A method for preparing a lithium cobalt-based positive electrode active material, comprising:
  preparing a mixture by mixing a cobalt precursor containing sodium and calcium in an amount of 600 ppm or less based on a total amount of the cobalt precursor with a lithium raw material; and
  firing the mixture to prepare a lithium cobalt-based positive electrode active material in which the total amount of sodium and calcium is 150 ppm to 500 ppm based on the total weight of the lithium cobalt-based positive electrode active material,
  wherein the lithium cobalt-based positive electrode active material is represented by Formula 1 below:

$$Li_{1-x}M^1_xCo_{1-y}M^2_yO_2 \qquad \text{[Formula 1]}$$

wherein $M^1$ includes Na and Ca, the $M^2$ is one or more selected from the group consisting of Al, Mg, W, Mo, Zr, Ti, Fe, V, Cr, Ba, Ca, and Nb, and $0<x\le0.1$ and $0\le y\le0.2$.

8. The method of claim 7, further comprising measuring contents of sodium and calcium in the cobalt precursor before the preparing of the mixture.

9. The method of claim 7, wherein the preparing the mixture further comprises mixing at least one of a sodium raw material and a calcium raw material.

10. The method of claim 9, wherein the sodium raw material and the calcium raw material are mixed such that the total amount of sodium and calcium in a lithium cobalt-based positive electrode active material is 150 ppm to 500 ppm based on the total weight of the lithium cobalt-based positive electrode active material.

11. The method of claim 7, wherein the sodium and calcium are in the amount of 50 ppm to 600 ppm.

* * * * *